United States Patent [19]
Hanson et al.

[11] 3,870,954
[45] Mar. 11, 1975

[54] STARTER SYSTEM FAULT DETECTOR
[75] Inventors: Richard Eric Hanson, Woburn; Howard Eisen Fineman, Newton Centre, both of Mass.
[73] Assignee: RCA Corporation, New York, N.Y.
[22] Filed: Oct. 9, 1973
[21] Appl. No.: 404,800

[52] U.S. Cl............................ 324/158 MG, 324/15
[51] Int. Cl............................................. G01r 31/00
[58] Field of Search......... 324/158 MG, 103 P, 133, 324/15

[56] References Cited
UNITED STATES PATENTS
3,667,289  6/1972  Back.................................. 324/15
3,774,109  11/1973 Janycky.......................... 324/103 P
3,775,675  11/1973 Freeze et al..................... 324/103 P Primary Examiner—Alfred E. Smith
Assistant Examiner—Ernest F. Karlsen
Attorney, Agent, or Firm—Edward J. Norton; Carl V. Olson

[57] ABSTRACT

A starter system fault detector includes means for detecting the initial peak current waveform of a starter motor and related components under test. A reference peak of the waveform is provided by either a fixed reference signal or a dynamic reference signal derived from and related to the maximum magnitude of the initial peak current waveform. In one embodiment the fault detector provides a fault indication if the magnitude of the initial current waveform signal fails to exceed the magnitude of the fixed reference signal during a predetermined time period. In another embodiment the fault detector provides a fault indication if the magnitude of the dynamic reference signal fails to exceed the magnitude of the initial current waveform recovery slope during a predetermined time period.

10 Claims, 6 Drawing Figures

STARTER SYSTEM FAULT DETECTOR

The invention herein described was made in the course of or under a contract or subcontract thereunder with the Department of the Army.

BACKGROUND OF THE INVENTION

This invention relates to starter system fault detection and, more particularly, to a fault detector wherein the starter motor current waveform is utilized to provide fault detection and diagnostic evaluation.

In the prior art, starter system fault detection has been accomplished by either removing the starter motor from its associated engine to perform, for example, bench testing, or by indirectly measuring the total current drain during a starting or cranking period such as by using a current shunt or probe. The removal of a starter motor has its obvious disadvantages in terms of time and expense. Further, indirect measurement of the total current drain does not always provide satisfactory results since the measured current may be influenced by faults other than a starter system fault. That is, since the indirect current measurement is usually performed during a time interval of several seconds, the measured current drain may be influenced by other engine faults. For example, a locked or seized crankshaft will cause the measured starter current to be substantially greater than its normal value. Similarly, low or zero engine compression will cause the measured starter motor current to be substantially less than its normal value.

The present invention provides, however, a means for testing the starter motor and starter system which is basically independent of engine conditions, and further permits starter motor testing while the starter motor is still mounted on the engine under test.

SUMMARY OF THE INVENTION

Briefly, the present invention provides a starter system fault detector for use with an engine having a starter motor and an electrical starter system which supplies starter current to the starter motor during a starting sequence. The detector comprises means for detecting the initial peak starter current waveform to provide a first signal indicative thereof, and means for providing a reference signal indicative of a given peak starter current waveform. Means are provided for comparing the first signal to the reference signal to provide an output signal indicative of the relative magnitude difference between the initial peak waveform and the given peak waveform. The detector includes means for providing a predetermined time period related to the time period of the initial peak waveform. Means are responsive to the output signal for providing a fault signal if the polarity of the relative magnitude difference fails to reverse during the predetermined time period, and means are responsive to the fault signal for providing a fault indication.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

It has been found that the initial peak of the starter motor current waveform is basically independent of engine condition. For normal starter operation this initial peak or transient is also the point of highest current drain and thus can be used for evaluating the current carrying capability of the starter motor. In the case of a defective starter motor the highest current drain is often limited by poor brush-to-commutator contact such as caused by worn, dirty or otherwise defective brushes.

Figure 1A:
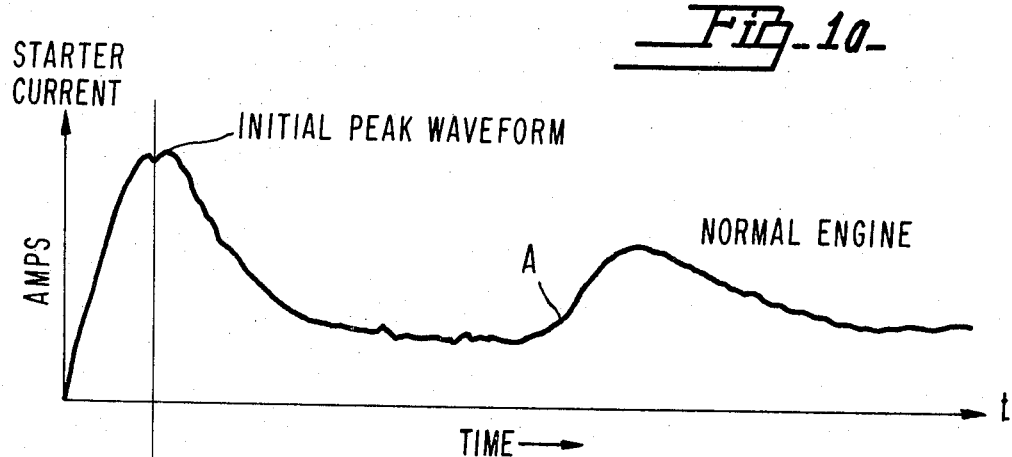
FIGS. 1a–1c are graphic representations of starter motor current waveforms, including the initial peak waveform, illustrating three engine conditions.
Figure 1B:
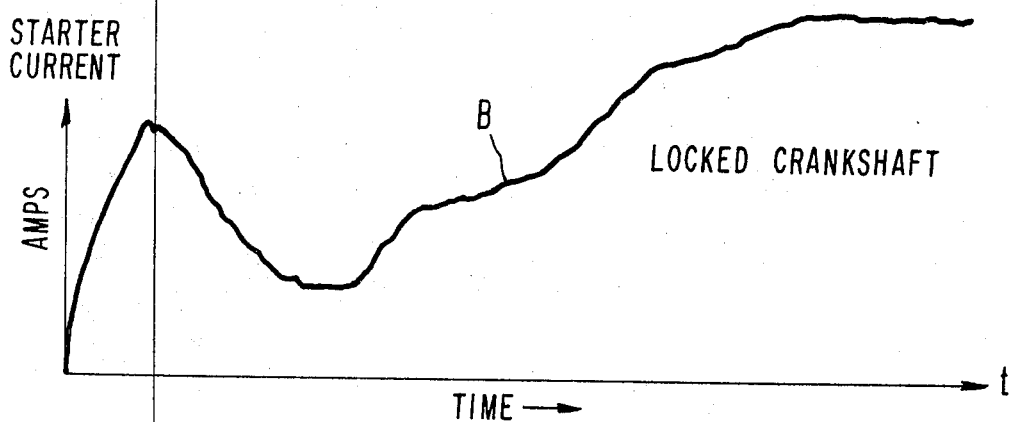
Figure 1C:
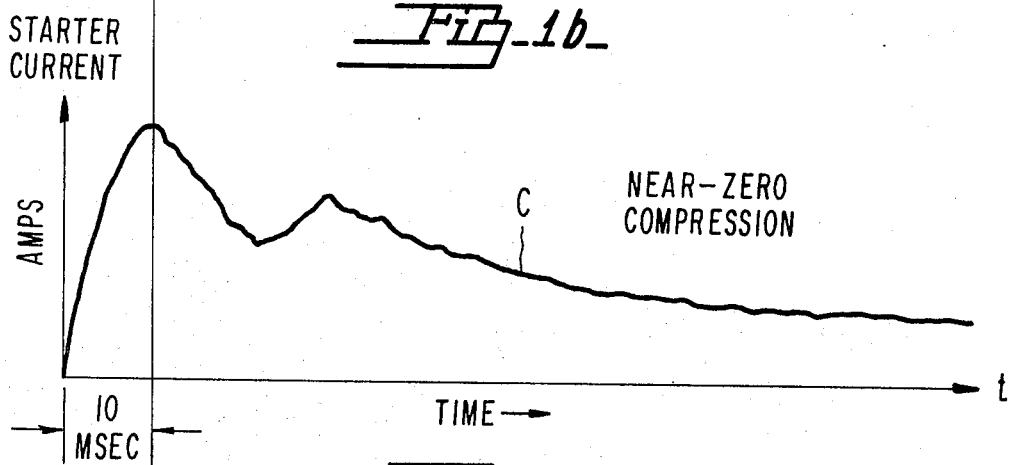

FIGS. 1a–1c respectively illustrate the starter motor waveform for a normal engine (curve A), an engine with a seized or locked crankshaft (curve B) and an engine with low or zero compression (curve C). These three curves illustrate three widely varying engine conditions and corresponding starter motor load conditions, and, moreover, illustrate the relative independence of the initial starter motor current peak. Tests performed on a bad starter showed that the initial peak starter current was current limited and indicative of possible poor or bad brush-to-commutator contact internal to the starter motor.

Figure 2:
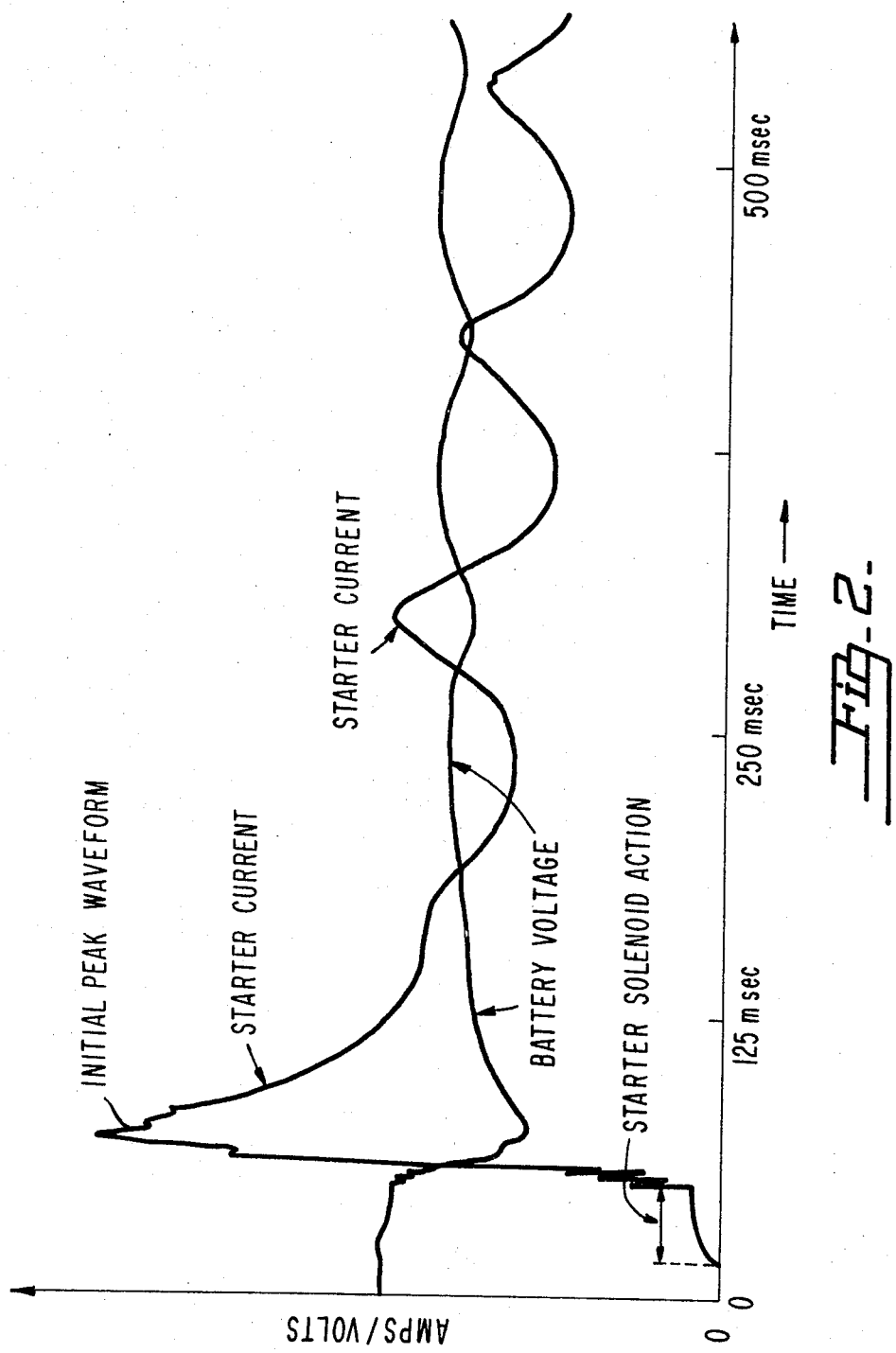
FIG. 2 is a graphic representation which illustrates the starter motor current waveform characteristics as taken from an actual engine.

Referring now to FIG. 2 there is shown a starter motor current waveform for a known good starter motor and engine. FIG. 2 illustrates the presence of a characteristic initial peak in the starter motor current waveform. The presence of the initial peak indicates normal starter motor operation. In accordance with the present invention, the initial peak of a starter motor under test is evaluated by testing for sufficient peak magnitude or by verifying that the initial peak also exhibits a recovery slope (trailing edge) which decreases sufficiently from the maximum initial peak value within proper time limits. In either event, good brush-to-commutator contact is established or verified. Further, a shorted starter motor would be manifested by the lack of a proper recovery slope after the initial maximum peak.

Still referring to FIG. 2 it can be seen that after the initial starter solenoid action, the maximum peak current is manifested within the next 20 milliseconds. Further, within the following 30 milliseconds, the peak starter waveform reduces substantially and approaches its steady-state cranking value indicative of engine cylinder compression cycles. It should now be apparent that a defective starter would fail to exhibit the characteristic initial peak current waveform as illustrated in FIG. 2. For example, a defective starter would fail to exhibit the peak magnitude of the waveform recovery slope depicted in FIG. 2. Clearly, a shorted starter motor would exhibit a current waveform which would continue to rise to a maximum value without manifesting the type of recovery slope exemplified in FIG. 2.

Figure 3:
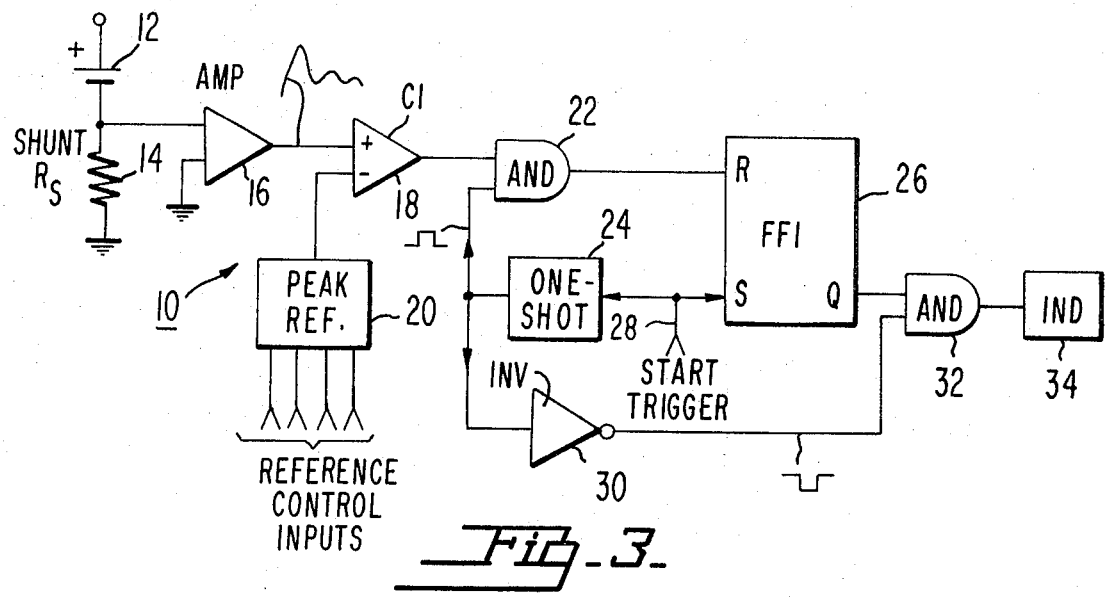
FIGS. 3 and 4 illustrate alternate embodiments of the present invention.

Referring now to FIG. 3 there is shown a first embodiment of a starter motor fault detector in accordance with the present invention. Detector 10 of FIG. 3 is shown in conjunction with a battery 12 and a shunt resistance 14 as would be provided in a typical engine starter motor electrical system. The positive terminal of battery 12 is adapted for coupling to a starter motor (not shown) by way of a solenoid switch (not shown). In FIG. 3 battery 12 is coupled to ground by way of shunt 14. Shunt 14, which functions to provide a signal indicative of the starter current waveform, typically takes the form of a relatively small resistance, such as, for example, a resistance device constructed to develop 100mv when passing 50 amps of current. However, it will be appreciated by those skilled in the art that various other means for detecting the initial peak starter current waveform may be provided. For example, a current probe inductively or directly coupled to starter motor input lead, or battery lead, can provide a similar signal. Further, even the battery cable itself, since it exhibits a small but finite resistance, can be used as a suitable shunt resistance.

Still referring to FIG. 3, the signal developed by shunt 14 is coupled as a first input to differential amplifier 16. The second input of amplifier 16 is coupled to ground. Accordingly, the output of amplifier 16 provides an amplified version of the signal developed by shunt 14, which, in turn, is coupled to a comparator 18. Amplifier 16 is coupled to the + input of comparator 18 and the − input of comparator 18 is coupled to the output of a peak reference means 20. Peak reference means 20 functions to provide a fixed reference signal indicative of a given peak starter current waveform. Means 20 may be provided with a plurality of control inputs to provide a selectable or programmable reference signal. Comparator 18 functions to provide an output signal indicative of the relative magnitude difference between the detected initial peak starter current waveform and the peak reference signal. For example, the output of comparator 18 provides a logic "1" whenever the magnitude of the detected starter current waveform exceeds the magnitude of the peak reference signal and provides a logic "0" when these input conditions are reversed.

The output of comparator 18 is coupled as a first input to an AND gate 22. The second input to AND gate 22 is provided by output of a monostable multivibrator or one-shot 24. The output of AND gate 22 is coupled to a reset (R) input of a bistable multivibrator or set-reset (RS) flip-flop 26. A start trigger input 28 is coupled to a set (S) input of flip-flop 26 and to the input of one-shot 24. The output of one-shot 24 is also coupled to an input of inverter 30. The output of inverter 30 is coupled as a first input to AND gate 32. A "true" or Q output of flip-flop 26 is coupled as a second input to AND gate 32. Finally, the output of AND gate 32 is coupled to indicating means 34.

The operation of detector 10 of FIG. 3 is described as follows. A logic "1" start trigger signal is preferably derived from the leading edge of the initial peak current waveform of the starter motor. With reference to FIG. 2 it can be seen that this start trigger signal may conveniently be derived from circuit means which is responsive to a predetermined current level following the starter solenoid action. For example, a threshold circuit can be arranged to provide a logic "1" output signal when the starter motor current exceeds the fixed given value which is greater than the solenoid current waveform. The start trigger signal causes the output of one-shot 24 to provide a logic "1" for a predetermined time period. The logic "1" output from one-shot 24 is inverted by inverter 30 to provide a logic "0" to the first input of AND gate 32. The start trigger signal on input 28 sets flip-flop 26 to provide a logic "1" at its Q output. Thus, with a logic "1" and a logic "0" applied as inputs to AND gate 32 its output will provide a logic "0." AND gate 32 provides a logic "0" output unless and until both inputs are in a logic "1" state. Indicator 34 functions to provide a fault indication whenever the output of AND gate 32 provides a logic "1."

If during the predetermined time period provided by one-shot 24 the output of comparator 18 provides a logic "1" (which would indicate that the magnitude of the initial peak current waveform has exceeded the peak reference signal) the output of AND gate 22 would provide a logic "1," thereby resetting flip-flop 26. Once reset, flip-flop 26 provides a logic "0" at its Q output. Thus, at the end of the predetermined time period, when the output of one-shot 24 again provides a logic "0," the output of inverter 30 will now provide a logic "1." However, since the Q output of flip-flop 26 is now a logic "0," due to the reversal of the input conditions of comparator 18 during the predetermined time period, the output of AND gate 32 remains a logic "0." Stated differently, since the initial peak waveform exceeds the peak reference signal during the predetermined time period, proper starter motor performance is indicated and indicator 34 does not provide a fault indication.

If, however, the output of comparator 18 fails to provide a logic "1" output during the predetermined time period, flip-flop 26 will not be reset. Thus, at the end of the predetermined time period the Q output of flip-flop 26 and the output of inverter 30 will both provide a logic "1" thereby causing indicator 34 to indicate the presence of a starter motor fault. It should be noted that the sequence is repeated each time a start trigger signal is provided on input 28.

In currently preferred practice the relative value of the reference signal provided by peak reference means 20 is selected to be 0.7 of the peak magnitude of the detected initial peak starter current waveform corresponding to a known good starter motor. Accordingly, a fault indication is not provided unless the initial current waveform magnitude of the starter under test is less than 0.7 of the magnitude of a known good starter motor. However, it should be noted that other values may be more appropriate to meet the needs of a given testing requirement.

Also, in currently preferred practice peak reference means 20 provides a plurality of given fixed reference signals. Accordingly, each reference signal is selected to accomodate the current drain of a different starter motor system.

Figure 4:
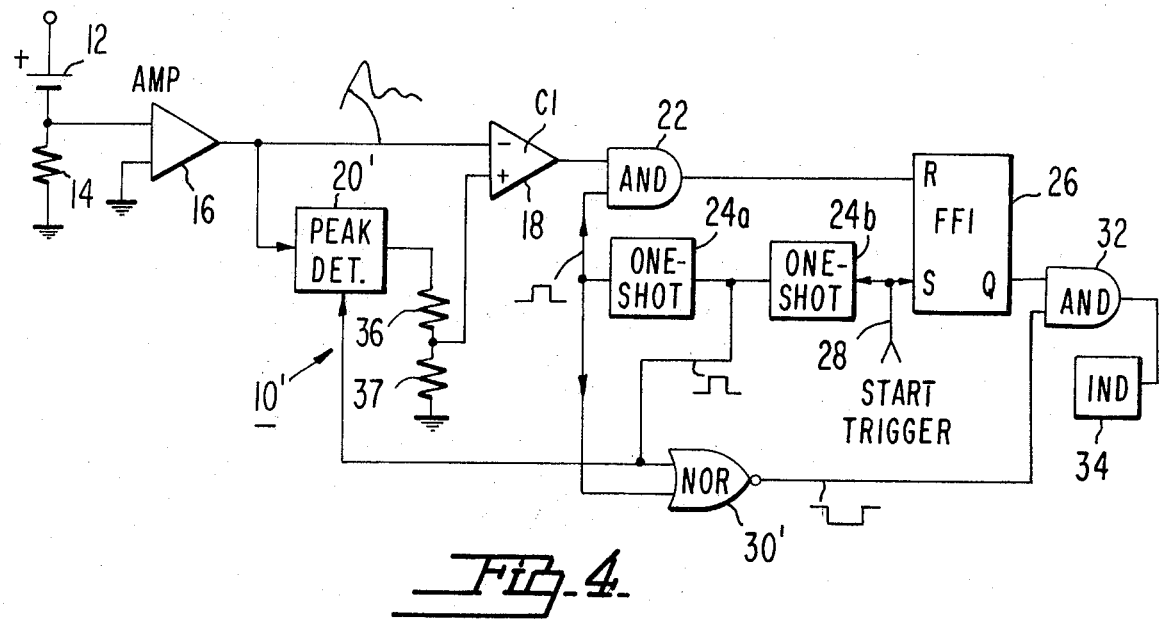

Referring now to FIG. 4 there is shown another embodiment of the present invention. Detector 10' of FIG. 4 is similar to detector 10 of FIG. 3 and accordingly like elements bear like reference numerals. The output of amplifier 16, of FIG. 4, is coupled to the − input of comparator 18 and to a signal input of peak detector 20'. The output of peak detector 20' is coupled to ground by way of resistors 36 and 37 which provide a resistive divider. The junction of resistors 36 and 37 is coupled to the + input of comparator 18.

The output of comparator 18 is coupled to AND gate 22 as in FIG. 3. The predetermined time period of detector 10' of FIG. 4 is provided by a one-shot 24a which, in turn is controlled by a one-shot 24b. The output of one-shot 24b is coupled as a first input to NOR gate 30' and to the input of one-shot 24a. The output of one-shot 24a is coupled to a second input of NOR gate 30' and to an input of AND gate 22. The output of one-shot 24b is also coupled as a gating input to peak detector 20'. The output of NOR gate 30' is coupled as a first input to AND gate 32.

Peak detector 20' functions to detect the maximum amplitude of peak magnitude of the initial peak starter current waveform during a period when a logic "1" is applied to its gating input, thereby to provide a dynamic reference signal which is derived from and related to the initial peak starter current waveform. The resistive divider, formed by resistor 36 and 37, functions to provide a scaled reference signal, indicative of a given peak starter current waveform, to comparator 18. The magnitude of the reference signal is determined by the peak magnitude of the initial peak current waveform and the values of resistors 36 and 37. The respective values of resistors 36 and 37 are selected to provide a predetermined voltage division at their junction. In currently preferred practice a ratio or division of 0.6 has been selected.

The reference signal output of peak detector is coupled to the + input of comparator 18. Accordingly, after an initial peak starter current waveform is detected to provide the dynamic reference signal, comparator 18 provides a logic "1" at its output when the magnitude of the initial peak starter current waveform falls below 0.6 of its peak magnitude value. Stated differently, the recovery slope of trailing edge of the detected starter current waveform must fall to 0.6 of its maximum value in order to cause an output signal reversal at the output of comparator 18.

One-shots 24a and 24b function to provide a predetermined time period which is related to the time period of the initial peak waveform. The output of the one-shot 24b which provides a logic "1" during a given time period, is also used as a gating input to peak detector 20' so that detector 20' detects the peak magnitude of the initial peak starter current waveform during the logic "1" output provided by one-shot 24b.

The output of one-shot 24a provides a logic "1" during its predetermined time period in response to the trailing edge of the output signal provided by one-shot 24b. The signal provided by one-shot 24a during the predetermined time period effectively gates the output of comparator 18 to the reset (R) input of flip-flop 26 by way of AND gate 22. Stated differently, one-shot 24a provides a time-window during a predetermined portion of the recovery slope or trailing edge of the detected initial peak starter current waveform. The given time period of the output pulse provided by one-shot 24b is related to the time duration of the leading edge of the detected initial peak waveform. It can be seen by reference to FIG. 2 that, after the starter solenoid action, the initial peak starter current waveform rises to its maximum value within 20 milliseconds and decreases to approximately 0.6 of its peak magnitude within 30 milliseconds. In view of the starter current waveform illustrated in FIG. 2, the time periods provided by one-shots 24a and 24b are preferably 30 and 20 milliseconds respectively.

Referring again to FIG. 4, the operation of detector 10' is described as follows. A start trigger signal provided on input 28 sets flip-flop 26 and starts the given time period of one-shot 24b. During the given period provided by one-shot 24b, peak detector 20' detects the peak magnitude of the initial peak starter current waveform. The logic "1" output from one-shot 24b causes the output of NOR gate 30' to provide a logic "0" to the first input of AND gate 32. The trailing edge of the logic "1" output signal provided by one-shot 24b starts the predetermined time period logic "1" output of one-shot 24a. The logic "1" thusly provided by one-shot 24a also maintains a logic "0" as the first input of AND gate 32. The predetermined output from one-shot 24a gates the output of comparator 18 to the reset (R) input of flip-flop 26.

If during the predetermined time period provided by one-shot 24a the output of comparator 18 provides a logic "1" (which would indicate that the initial peak current waveform has decreased in magnitude to a value less than the reference signal provided by peak detector 20') the output of AND gate 22 would provide a logic "1," thereby resetting flip-flop 26. Once reset, flip-flop 26 provides a logic "0" at its Q output. Thus, at the end of the predetermined time period, when the output of one-shot 24a resumes its logic "0" state, the output of NOR gate 30' will provide a logic "1." However, since the Q output of flip-flop 26 was reset to its logic "0" state, due to the reversal of the input conditions of comparator 18 during the predetermined time period, the output of AND gate 32 remains in a logic "0" state. Stated somewhat differently, since the recovery slope or trailing edge of the initial peak waveform decreased below the level of the reference signal during the predetermined time period, proper starter motor performance is indicated and indicator 34 accordingly does not provide a fault indication.

If, however, the output of comparator 18 fails to provide a logic "1" output during the predetermined time period, flip-flop 26 will not be reset. In this event, the Q output of flip-flop 26 and the output of NOR gate 30', at the end of the predetermined time period will both provide a logic "1," thereby causing indicator 34 to indicate the presence of a starter motor fault. It should also be noted that the sequence is repeated each time a start trigger signal is provided on input 28.

Thus, in accordance with the present invention, individual starter faults as well as overall starter system deficiencies are detected from the initial peaks or transients of the starter motor current waveform. Although the preferred embodiment of the present invention utilizes a starter motor current waveform, it should be noted that a suitable waveform can also be derived from the battery voltage waveform. That is, since the battery of the starter electrical system exhibits internal resistance, the same basic waveform is reflected as an inverted signal superimposed on the battery voltage. Thus, the starter motor current waveform can be detected from the battery voltage waveform. However, since the magnitude of the battery voltage waveform is dependent on battery conditions, compensation is accordingly required if the absolute magnitudes of the signals are utilized in a given embodiment of the present invention. Moreover, however, it will be noted that the embodiment of the present invention depicted in FIG. 4 functions independently of the absolute magnitude of the detected current waveform. Stated somewhat differently, since the dynamic reference signal is derived from and related to the detected initial peak waveform, the embodiment of FIG. 4 is particularly suitable for those applications where the battery voltage waveform is utilized.

The form of the invention illustrated and described herein is the preferred embodiment of the teachings in the form currently preferred for manufacture. It is shown as a illustration of the inventive concept, however, rather than by way of limitation, and it is pointed out that various modifications and alterations may be indulged in within the scope of the appended claims.

Having thus described the invention, what we claim as new and desire to protect by United States Letters Patent is:

1. A starter system fault detector for use with an engine having a starter motor and an electrical starter system which supplies starter current to said starter motor during a starting sequence, said fault detector comprising, in combination:
   means for detecting the initial starter current waveform peak to provide a first signal indicative thereof;
   means for providing a reference signal indicative of a given starter current waveform peak;
   means for comparing said first signal to said reference signal to provide an output signal indicative of the relative magnitude difference between said initial waveform peak and said given waveform peak;
   means for providing a predetermined time period related to the time period of said initial waveform peak;
   means responsive to said output signal for providing a fault signal if the polarity of said relative magnitude difference indicates that the initial starter waveform peak is greater than the reference signal, and the polarity of the relative magnitude difference fails to reverse and indicate a waveform value less than the reference signal during said predetermined time period; and
   means responsive to said fault signal for providing a fault indication.

2. The fault detector according to claim 1, wherein said reference signal is a predetermined, fixed-value signal.

3. The fault detector according to claim 2, wherein said predetermined time period includes the time period when said initial waveform peak exhibits its maximum value.

4. The fault detector according to claim 3, wherein said means for providing a predetermined time period includes means responsive to a predetermined current level of said initial waveform peak for providing said time period after said starter current exceeds said current level.

5. The fault detector according to claim 1, wherein said reference signal is a given, fixed-value signal and wherein said means for comparing said first signal to said reference signal comprises a comparator having a first input to which said first signal is applied and a second input to which said reference signal is applied, so that said means responsive to said output signal provides said fault signal when the magnitude of said first signal fails to exceed said reference signal.

6. The fault detector according to claim 1, wherein said reference signal is a dynamic reference signal derived from and related to the maximum magnitude of said initial starter current waveform peak and wherein said predetermined time period includes only the portion of said time period of said initial waveform peak following the maximum magnitude of said initial current waveform peak.

7. The fault detector according to claim 6, wherein said means for providing said dynamic reference signal comprises a peak detector having an input coupled to said means for detecting the initial starter current waveform peak, said peak detector having an output; and,
   said means for comparing said first signal to said dynamic reference signal comprises a comparator having a first input coupled to the output of said peak detector and a second input to which said first signal is fed, so that said means responsive to said output signal provides a fault signal when the magnitude of said dynamic reference signal fails to exceed the magnitude of said first signal.

8. The fault detector according to claim 7, wherein said means responsive to said output signal comprises a flip-flop having a set input coupled to said means for providing said predetermined time period, a reset input coupled to the output of said comparator, and said flip-flop having an output coupled to said means responsive to said fault signal.

9. The apparatus according to claim 8, including time delay means coupled between said input of said flip-flop and said means for providing a predetermined time period, said delay means being further coupled to said peak detector so that the output of said peak detector provides an output signal indicative of the maximum magnitude of said initial waveform peak during said delay period.

10. The apparatus according to claim 9, including a resistive divider coupled between said peak detector and said first input of said comparator so that the dynamic reference signal fed to said comparator is a predetermined portion of the peak detector output signal.

* * * * *